No. 689,225. Patented Dec. 17, 1901.
A. H. PEIRCE & L. A. FOOTE.
CAR SEAL.
(Application filed July 6, 1901.)
(No Model.)
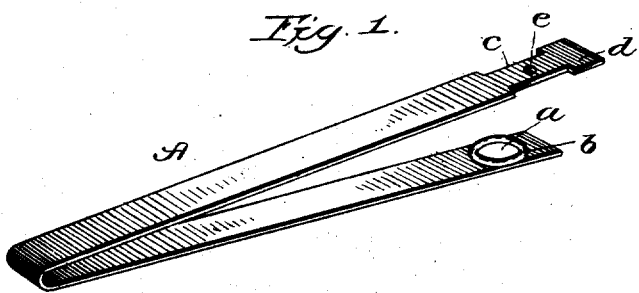
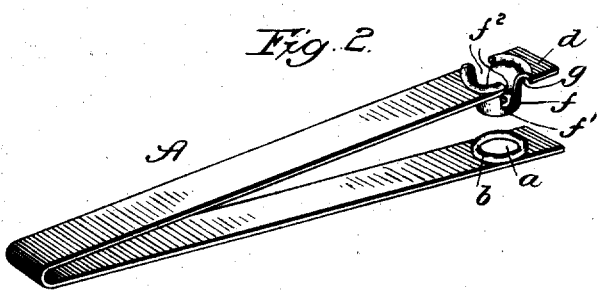
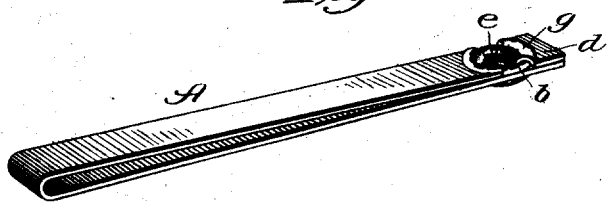
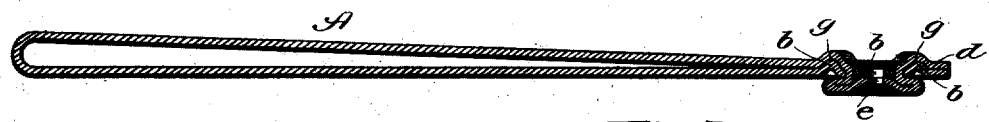
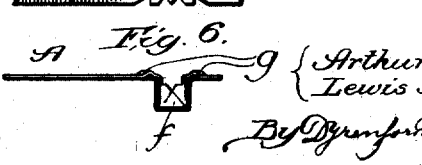
Witnesses:
Inventors:
Arthur H. Peirce and
Lewis A. Foote,

UNITED STATES PATENT OFFICE.

ARTHUR H. PEIRCE AND LEWIS A. FOOTE, OF CHICAGO, ILLINOIS; SAID FOOTE ASSIGNOR TO CHICAGO CAR SEAL & MANUFACTURING COMPANY, OF CHICAGO, ILLINOIS, A CORPORATION OF ILLINOIS.

CAR-SEAL.

SPECIFICATION forming part of Letters Patent No. 689,225, dated December 17, 1901.

Application filed July 8, 1901. Serial No. 67,527. (No model.)

*To all whom it may concern:*

Be it known that we, ARTHUR H. PEIRCE and LEWIS A. FOOTE, citizens of the United States, residing at Chicago, in the county of Cook and State of Illinois, have invented a new and useful Improvement in Car-Seals, of which the following is a specification.

This invention relates to improvements in seals of the class generally termed "car-seals" and consisting of a strip or shackle of thin flexible metal, preferably tin, provided in opposite ends, respectively, with a rivet and rivet-hole, whereby the ends may be secured together in sealing engagement with a suitable hand-press. In seals of this type there is an important advantage in having the rivet or eyelet formed integral with the shackle portion and in having it as long and also as large in diameter as possible consistent with the width of the shackle, whereby when upset by the press to lock the seal it will form a comparatively large button, which cannot be unfastened without breaking the seal. Attempts have been made to produce a rivet or eyelet integral with the shackle by perforating and flanging the metal or by drawing it to form a rivet; but in either case the eyelet or rivet must be very short unless a more ductile and expensive metal than commercial tin is employed.

Our object is to provide a car-seal of improved construction having an integral struck-up rivet so formed that it may be of any desired length and of any desired diameter without materially weakening the strip or necessitating the employment of metal of greater ductility than that usually employed for car-seals.

In the drawings, Figure 1 is a perspective view of a blank or shackle before the rivet portion is formed. Fig. 2 shows the seal completed. Fig. 3 shows the seal locked; Fig. 4, an enlarged longitudinal section of the locked seal; Fig. 5, a broken plan view of a blank formed with a serrated neck portion, and Fig. 6 a broken view showing a rivet portion struck up from the serrated blank.

A is the shackle, comprising a thin and narrow strip preferably of what is known as "commercial sheet-tin." This metal is the most desirable of which we are aware for the purpose, all things considered. It is sufficiently but not too pliable and of sufficiently low ductility to prevent the seal from being unfastened without breaking the metal. The blank is provided in one end portion with an opening $a$, as large in diameter as the width of the strip will permit while leaving the part sufficiently strong. We prefer to punch the opening $a$ with a die, which will at the same time form an annular ridge or tongue $b$ around the opening. The opposite end portion of the blank is cut away on opposite sides, as shown in Fig. 1, or serrated, as shown in Fig. 5, to form a neck $c$ and leave an end $d$ of the width of the strip. We prefer to provide a small opening $e$ in the middle of the neck portion.

The rivet or eyelet $f$ is formed by striking up the neck portion between suitable dies. In this operation there is very little drawing upon the metal, and the rivet is formed by bending and shaping the neck portion, with the result of materially shortening the strip. The outer end of the rivet may be of flat disk shape, with a narrow flange $f'$ at opposite sides at the ends of the slots $f^2$, which separate the segmentally-shaped walls of the rivet in Fig. 2, or this flange, with the serrations, Fig. 5, may be shaped to appear as shown in Fig. 6. In forming the disk-shaped end and flanges $f'$ of the rivet the metal may be expanded slightly under the pressure of the dies, and the opening $e$, when provided, permits the expansion to take place more readily and without danger of injurious strain upon the metal. We prefer to form the rivet portion between dies that will also strike down the metal around the rivet to form an annular cup or groove $g$, which when the rivet is passed through the opening $a$ will fit over the ridge or tongue $b$.

The seal is provided for the market in the form shown in Fig. 2. To lock the seal, the rivet is passed through the opening $a$, and a suitable hand-press is used to upset the rivet, whereby the ends of the seal are fastened together, as shown in Figs. 3 and 4. Owing to the length and diameter of the rivet it will cover, when upset by the press employed, a comparatively large area around the opening and form a button, which cannot be withdrawn without breaking the seal at the opening $a$. As the parts are pressed together in the sealing operation the tongue $b$ enters the groove $g$, giving additional security to the fastening.

It is not essential that the end $d$ shall be wider than the neck portion $c$ or that the neck shall be formed as shown and described or that the rivet shall be round or of any particular shape in cross-section. It is merely necessary that the rivet when formed, as described, by striking up and shortening the strip shall be capable of passing through an opening $a$ in the other end of the shackle.

While we prefer to provide the seal as shown and described, it may be variously modified in the matter of details without departing from the spirit of our invention as defined by the claims.

What we claim as new, and desire to secure by Letters Patent, is—

1. In a car-seal, a sheet-metal shackle having a rivet-hole in one end portion and a rivet in its opposite end portion, comprising a struck-up section of the shackle-strip shortening said section across the full width thereof, substantially as set forth.

2. In a car-seal a sheet-metal shackle having a rivet-hole in one end portion and a rivet in its opposite end portion comprising a struck-up section of the shackle-strip shortening said section across the full width thereof, the metal about the rivet-hole and rivet being formed with tongue-and-groove engaging members, substantially as set forth.

ARTHUR H. PEIRCE.
LEWIS A. FOOTE.

In presence of—
S. W. LEE,
ALBERT D. BACCI.